United States Patent [19]

Umlauft et al.

[11] Patent Number: 5,075,056
[45] Date of Patent: Dec. 24, 1991

[54] PROCESS FOR THE PRODUCTION OF A BALL GAME RACKET FRAME

[75] Inventors: Helmut Umlauft, Hard; Karl-Heinz Wäger, Götzis, both of Austria

[73] Assignee: Head Sportgerate Gesellschaft m.b.H. & Co. OHG, Austria

[21] Appl. No.: 448,098

[22] Filed: Dec. 12, 1989

[30] Foreign Application Priority Data

Dec. 15, 1988 [AT] Austria ............................... 3064/88

[51] Int. Cl.$^5$ ...................... B29C 45/00; B29C 45/72; B29C 45/78

[52] U.S. Cl. ................................. 264/85; 264/327; 264/572; 273/73 C; 273/73 F

[58] Field of Search ............... 264/572, 85, 257, 328.1, 264/327, 40.7, 328.13, 328.7, 513, 40.3, 40.5; 425/812

[56] References Cited

U.S. PATENT DOCUMENTS

| | | | |
|---|---|---|---|
| 4,297,308 | 10/1981 | Popplewell | 264/46 |
| 4,393,024 | 7/1983 | You | 264/257 |
| 4,440,392 | 4/1984 | Popplewell | 273/73 |
| 4,685,881 | 8/1987 | Sasaki | 264/572 |
| 4,740,150 | 4/1988 | Sayer | 264/572 |
| 4,836,543 | 6/1989 | Holzer | 273/73 |
| 4,855,094 | 8/1989 | Hendry | 264/572 |
| 4,874,570 | 11/1989 | Haines | 264/154 |
| 4,913,644 | 4/1990 | Kauer | 425/553 |
| 4,917,594 | 4/1990 | Gellert | 264/572 |
| 4,923,666 | 5/1990 | Yamazaki | 264/572 |
| 4,935,191 | 6/1990 | Baxi | 264/572 |
| 4,942,006 | 7/1990 | Loren | 264/328.1 |
| 4,944,910 | 7/1990 | Hendry | 264/572 |

Primary Examiner—Jay H. Woo
Assistant Examiner—Jeremiah F. Durkin, II
Attorney, Agent, or Firm—Nixon & Vanderhye

[57] ABSTRACT

A process for the production of a ball game racket frame, in particular a tennis racket, squash racket or badminton racket frame, with a head and a shaft, in which at least the head and/or the shaft is made of a fiber-reinforced plastic as a hollow body, an injectable matrix, optionally with a reinforcing fiber material and an inert gas under pressure, in particular $N_2$, is injected into a mold to form the hollow space of the hollow body.

18 Claims, No Drawings

PROCESS FOR THE PRODUCTION OF A BALL GAME RACKET FRAME

BACKGROUND OF THE INVENTION

The invention relates to a process for the production of a ball game racket frame, in particular a tennis racket, squash racket or badminton racket frame, with a head and a shaft, in which at least the head and/or the shaft is made of a fiber-reinforced plastic as a hollow body.

Frames for ball rackets, e.g., for tennis, squash and badminton, were produced in the past mostly of wood. A wooden frame for a ball racket had a complicated design that comprised many layers and laminates that had to be connected to one another. The production of such a frame was a difficult and time-consuming process. Such wood designs show favorable playing features.

Recently, mainly new materials, such as metal and reinforced plastics, have been used for racket construction.

Because of the greater specific weights of these materials, it became necessary to develop frame embodiments or designs that are hollow, because otherwise the weight of the racket would become unacceptably high. Such hollow frame designs can, in the case of metals, be made by a drawing or extrusion process. In the case of reinforced plastic materials, hollow body designs can be achieved by lamination processes and encapsulation of a light core material, e.g., plastic foam, or by using a hollow molding process, e.g., the blow molding process.

From AT-PS 381 864 there has already become known a process of the above-mentioned type in which supports, made integrally with a racket head designed as a hollow body, were molded onto the walls. The formation of the hollow spaces was performed here according to conventional processes and, according to this proposal, a core that melts at low temperature is used during injection molding. Also from EP-A-188 127 it has already become known to perform a so-called melting core process in which the core, also brought in to form the hollow space, was melted out by heating after the racket wall sets. This process is very expensive, since the low-temperature melting core must be premolded.

As is usual with injection molding of molded parts, conventional injection molding processes can be performed preferably with materials that are brought in as melts. Such materials, as they are usually used for injection molding processes, are known. But ball rackets produced with injection molding processes do not exhibit the great rigidity and strength at sufficiently low weight that are desired for a really high quality racket. The known plastic rackets are molded with a head part that is not hollow, and its strength to weight ratio or rigidity to weight ratio is lower than is desired for highly qualified ball game rackets. Thus, these ball game rackets are less rigid and less strong than those made of a combination of continuous yarn or fiber materials and a matrix.

In any case, with the previously known injection molding processes for the production of ball racket frames, expensive molds are used to be able to inject both the supports and crosspieces necessary for stability. Recovery of the low temperature melting core represents an additional expenditure of time. In all these production processes, crosspieces remain between the walls, which essentially additionally offer only limited strengths since, viewed structurally, the crosspieces lie in the neutral zone of the frame and thus, only as additional weight, can exert a detrimental influence on the swing behavior or balance of the frame.

From DE-A1 34 16 377 there has become known another injection molding process for tennis racket frames in which, to achieve the necessary stability, especially expensive measures were taken. In particular, the process known from the DE-A1 34 16 377 consists in that a majority of injection molded parts are to be connected to one another by welding, bonding and optionally screwing. Ribs, crosspieces, supports and connections are required by the process in these conventional injection molding processes.

In all previously known injection molding processes, it was possible to achieve a change in the wall thickness essentially only in that several molds were worked with and several parts were later connected to one another. When crosspieces with perforations for accepting the strings are molded on, the final position of the holes provided for the strings are already established in the mold, and subsequently it is not easily possible to change the stringing subsequently.

The material for the supports or crosspieces, brought in additionally in a not exactly controllable way, further leads to an increase in weight and to a final, established swing behavior or to considerable limitations with respect to the balance of the racket.

To avoid such ribs, crosspieces, supports and connections, previously there was essentially known an especially labor-intensive process in which partially set material in the form of sheets was used. For the production of strong, lightweight objects, such as for the production of racket frames, such material must be molded around a core structure, and this core structure is to expand during the molding operation to yield a satisfactory stabilization. Such an expandable core can be made of an expandable plastic or be used as inflatable tube, e.g., as silicon rubber tube, which can, if necessary, be removed subsequently from the molded object. Such a procedure is naturally exceedingly labor-intensive, especially because the thermosetting resins used must be kept for several minutes at a suitably high temperature to guarantee the setting and because, for mass production, for this reason a large number of molds is necessary.

SUMMARY OF THE INVENTION

Now the object of the invention is to provide a process of the initially mentioned type with which a ball game racket frame can be directly made, a racket frame that, without changes in the mold, can largely be adapted to the respective requirements with respect to its balance, its swing behavior, its weight distribution and its stability properties and which leads directly to reproducible wall thicknesses with improved surface properties and with which ribs, crosspieces or the like can be avoided. To achieve this object, the process according to the invention essentially consists in that a matrix system optionally with a reinforcing fiber material and an inert gas under pressure, in particular $N_2$, is injected into a mold to make the hollow space of the hollow body. After the setting of the plastic in the mold, the ball game racket frame can be removed from the mold. Mainly thermoplastics are used here as the matrix.

DETAILED DESCRIPTION OF THE PREFERRED EMBODIMENT

The term "thermoplastic" is used as a designation for plastic that can be repeatedly molded under the effect of heat and pressure.

In the case of thermoplastic material, an amount of raw material dosed according to weight or volume is compressed and plasticized in a heated cylinder. The melt is injected through a nozzle into a mold and demolded after setting.

In the case of thermosetting plastics, the essentially free material is injected into a heated mold in which the setting then takes place.

The use of inert gas under pressure and according to a preferred embodiment under a pressure of 250 to 600 bars, preferably about 400 bars, results here directly in an especially smooth surface that can be used as the final surface without expensive refinishing. A complete hollow body structure that exhibits the required strength, rigidity and a suitably dense structure in the wall of the hollow body can be obtained directly, and additional partitions, ribs and crosspieces can be dispensed with.

It is true that the measure of only subsequently producing the holes for the strings in a separate work step represents an additional expense, but it can also be largely automated. This additional expense compares with the advantage of the free choice of string arrangement with the same ball game racket frame. Injection molding processes in which hollow spaces are made with nitrogen under pressure, are essentially the known prior art. But the use of this known process for the production of ball game racket frames, in combination with the required properties of ball game racket frames, results in a series of additional advantages and, in addition to achieving an especially dense and smooth surface, the possibility of being able to influence the wall thickness of the material is of particular significance.

For selectively influencing the wall thickness of the ball racket and thus for changing the strength, balance and weight of the ball game racket frame, the process according to the invention is performed here preferably so that the mold to make varying wall thicknesses is partially heated and/or cooled, and to achieve a greater wall thickness, the corresponding area of the mold is kept at a lower temperature than areas for achieving lesser wall thicknesses. Partially heating and/or cooling to make varying wall thicknesses guarantees an exact temperature control within the narrowest tolerance range over the entire mold area. By varying the course of the temperature inside the mold, the wall thickness can be precisely and selectively influenced. Regional cooling of partial areas of the mold leads here, by premature setting of the matrix in the cooled area, to the formation of a thicker wall thickness and thus to an accumulation of weight in this area, by which the balance and also the swing behavior can be changed in a controllable way. In particular, by setting a temperature gradient, it becomes possible to assure a continuous progression of the wall thickness, which can be exploited for particularly advantageous swing properties.

With the simultaneously use of inert gas, such as for example nitrogen, under pressure, essentially a series of plastics can be processed in injection molding, and preferably the process is performed so that, as a matrix, there are used plastics, in particular:

| | |
|---|---|
| polyimides | PI |
| polyamidimides | PAI |
| polyphenylene sulfones | PPSU |
| polyether sulfones | PES |
| polyether imides | PEI |
| polysulfones | PSU |
| polyaryl esters | |
| polyether ketones | PEK |
| polyether ether ketones | PEEK |
| polyphenylene sulfides | PPS |
| polycarbonates | PC |
| polyacetals | POM |
| polyamide 66 | PA 66 |
| polyamide 6 | PA 6 |
| polyamide 11 | PA 11 |
| polyamide 12 | PA 12 |
| polyethylene terephthalates | PET |
| polybutylene terephthalates | PBT |
| polyphenylene oxide | PPO |
| thermoplastic polyesters | PBTB |

Depending on the choice of plastic, here it can be advantageous also to use reinforcing fiber material in a way known in the art, and in the context of the process according to the invention, the use of reinforcing fiber material in lengths between 1 and 10 mm, in particular in lengths up to 5 mm, has proven to be especially advantageous. In particular, with shorter fiber lengths, a largely random distribution of the orientation of the fibers can be assured here, so that a homogeneous structure of the reinforcement is assured. Such fiber lengths are especially suitable when the process according to the invention is to be performed quickly and when, in a short cycle time, the matrix and the reinforcement material are to be injected and the required inert gas pressure is to be generated. In a way known in other processes, here it is possible to proceed so that the reinforcing fiber material is used in amounts of 5-50%, 50% by weight, preferably 20-50% by weight, relative to the matrix.

In view of the formation of varying wall thicknesses because of the previously set course of the temperature in the injection mold, it is especially advantageous to control the amount of plastic that is to be brought in as a melt so that plastic is brought in an amount that yields wall thicknesses between 0.8 and 3 mm. Such a wide range in the changeability of the wall thickness cannot be achieved with conventional injection molding processes with a mold. Here, as reinforcing fiber material, the known carbon fibers, glass fibers and/or aramid fibers can be used.

Advantageously, the process according to the invention is performed so that the mold is kept at temperatures between 60° and 90° C. and preferably at temperatures between 70° and 80° C., and with the use of an inert gas pressure between 250 and 600 bars, at about 400 bars an especially high degree of reproducibility of the results was achieved. As an inert gas, essentially nonflammable media are suitable, and nitrogen has proven to be especially advantageous and guarantees a high degree of economy. With the known units for producing gas mold injection molding products, to increase economy, it has further already been proposed again to evacuate the inert gas after the matrix sets and before the demolding of the racket, so that a reuse of the inert gas becomes possible.

The inert gas pressure here can assume the function of the afterpressure during injection molding, so that surface defects can be avoided with certainty. Overall, thus there results directly a ball game racket frame that can be used without further surface treatment, such as for example grinding, cementing, polishing and varnishing.

With respect to the high precision with regard to dimensional stability and controllability of the wall thicknesses, subsequent compensating work to achieve the desired balance is not necessary either and, in particular, operations such as the subsequent attachment of weights or the grinding off of wall thicknesses to achieve lesser wall thicknesses are eliminated. Since a hollow profile with a contour closed in the peripheral direction is directly achieved, the bonding of shell parts, necessary in previously known production processes for ball game racket frames made of hollow profiles, is also eliminated, as well as the necessary finishing work after such a bonding. In the context of the process according to the invention, the use of polyamide 6.6 in combination with carbon fibers with a percentage of weight of 20 to 50 % by weight relative to the melt with a maximum fiber length of about 5 mm has turned out to be especially advantageous.

We claim:

1. A method for the production of a ball game racket frame having a head and a shaft wherein at least one of the head and shaft is made as a hollow fiber-reinforced plastic body, having a hollow space, utilizing a mold, comprising the steps of:
   (a) injecting a plastic matrix system with reinforcing fiber material and an inert gas under pressure into the mold to form the hollow space of the hollow body of the frame;
   (b) forming one part of the racket with a thicker section by controlling the temperature of at least one part of the mold to vary the wall thickness of the frame at that mold part; and then
   (c) allowing the frame to cool and then removing it from the mold.

2. A method as recited in claim 1 wherein nitrogen is the inert gas.

3. A method as recited in claim 2 wherein the nitrogen is injected at a pressure of between about 250–600 bars.

4. A method as recited in claim 3 wherein the mold is kept at a temperature of between 60°–90° C. during step (a).

5. A method as recited in claim 4 wherein the wall thicknesses of the frame are in the range of betweem 0.8 and 3 mm.

6. A method as recited in claim 1 wherein the wall thicknesses of the frame are in the range of between 0.8 and 3 mm.

7. A method as recited in claim 1 wherein the inert gas is injected at a pressure of between about 250–600 bars.

8. A method as recited in claim 1 wherein the mold is kept at a temperature of between 60°–90° C. during step (a).

9. A method as recited in claim 1 wherein reinforcing fibers having lengths in the range of between 1 and 10 mm are utilized in step (a).

10. A method as recited in claim 1 wherein reinforcing fiber in the amount of between 5–50% by weight relative to the total plastic matrix system with reinforcing fiber material, is injected into the mold.

11. A method as recited in claim 10 wherein the reinforcing fibers are selected from the group consisting of carbon fibers, glass fibers, and aramid fibers.

12. A method as recited in claim 1 wherein the plastic matrix system utilized is selected from the group consisting essentially of polyimides, polysulfones, polyaryl esters, polyether ketones, polyphenylene sulfides, polycarbonates, polyacetals, polyamide 66, polyamide 6, polyamide 11, polyamide 12, polyethylene terephthalates, polybutylene terephthalates, polyphenylene oxide, and thermoplastic polyesters.

13. A method for the production of a ball game racket frame having a head and a shaft wherein at least one of the head and shaft is made as a hollow plastic body, having a hollow space, utilizing a mold, comprising the steps of:
   (a) injectinng a plastic matrix system and an inert gas under pressure into the mold to form the hollow space of the hollow body of the frame;
   (b) controlling the temperature of at least one part of the mold to vary the wall thickness of the frame at that mold part, the lower the temperature of a part of the mold, the less the wall thickness at that part; and then
   (c) allowing the frame to cool, and then removing it from the mold.

14. A method as recited in claim 13 wherein controlling the temperature is accomplished by heating a part of the mold.

15. A method as recited in claim 13 wherein controlling the temperature is accomplished by heating a part of the mold, and cooling another part.

16. A method as recited in claim 13 wherein controlling the temperature is accomplished by cooling a part of the mold.

17. A method as recited in claim 13 wherein the mold is kept at a temperature of between 60°–90° C. during steps (a) and (b).

18. A method as recited in claim 17 wherein the wall thicknesses of the frame are in the range of between 0.8 and 3 mm.

* * * * *